(12) United States Patent
Towata

(10) Patent No.: US 11,153,305 B2
(45) Date of Patent: Oct. 19, 2021

(54) APPARATUS, SYSTEM AND METHOD FOR MANAGING AUTHENTICATION WITH A SERVER

(71) Applicant: Canon U.S.A., Inc., Melville, NY (US)

(72) Inventor: Hiroaki Towata, Great Neck, NY (US)

(73) Assignee: Canon U.S.A., Inc., Melville, NY (US)

( * ) Notice: Subject to any disclaimer, the term of this patent is extended or adjusted under 35 U.S.C. 154(b) by 50 days.

(21) Appl. No.: 16/010,260

(22) Filed: Jun. 15, 2018

(65) Prior Publication Data
US 2019/0386985 A1 Dec. 19, 2019

(51) Int. Cl.
G06F 7/04 (2006.01)
G06F 15/16 (2006.01)
H04L 29/06 (2006.01)

(52) U.S. Cl.
CPC ...... *H04L 63/0853* (2013.01); *H04L 63/0876* (2013.01)

(58) Field of Classification Search
CPC .............. G06F 3/1269; H04L 63/0853; H04L 63/0876
See application file for complete search history.

(56) References Cited

U.S. PATENT DOCUMENTS

| | | | |
|---|---|---|---|
| 9,038,138 B2 | 5/2015 | Trammel et al. | |
| 9,148,548 B2 | 9/2015 | Nuggehalli | |
| 9,178,868 B1* | 11/2015 | Leung | H04L 67/02 |
| 2006/0184533 A1* | 8/2006 | Koganei | H04N 21/8402 |
| 2007/0106905 A1* | 5/2007 | Ito | G06F 21/31 713/184 |
| 2011/0179466 A1* | 7/2011 | Hamada | H04N 1/00474 726/3 |
| 2013/0044343 A1* | 2/2013 | Matsugashita | G06F 3/1238 358/1.14 |
| 2013/0097686 A1* | 4/2013 | Towata | G06F 21/31 726/9 |
| 2013/0215455 A1* | 8/2013 | Armstrong | G06F 3/1222 358/1.15 |
| 2014/0123236 A1* | 5/2014 | Hirata | H04L 63/0807 726/4 |
| 2014/0137232 A1* | 5/2014 | Kobayashi | H04L 63/083 726/17 |
| 2014/0230020 A1* | 8/2014 | Mogaki | H04L 63/10 726/4 |
| 2014/0355034 A1* | 12/2014 | Mihara | G06F 3/1238 358/1.14 |

(Continued)

OTHER PUBLICATIONS

Oautho, Refresh Tokens, https://auth0.com/docs/tokens/refresh-token/current, accessed on Jun. 15, 2018.

*Primary Examiner* — Darshan I Dhruv
(74) *Attorney, Agent, or Firm* — Canon U.S.A., Inc. IP Division

(57) ABSTRACT

An access management system including a server is provided. The server receives, from a client device, a request to log into the server with first information specifying identifying a user that has logged into the client device and second information specifying the client device. The server authenticates the client device using the second information and accesses a service provided by an external apparatus and receive a token for accessing the service. The server associates, in memory, the first information with the received token to enable subsequent access to the service, by the server.

18 Claims, 11 Drawing Sheets

(56) References Cited

U.S. PATENT DOCUMENTS

| | | | |
|---|---|---|---|
| 2014/0365526 A1* | 12/2014 | Sato | G06F 21/6209 707/784 |
| 2014/0373103 A1* | 12/2014 | Hirata | G06F 21/608 726/4 |
| 2014/0380428 A1* | 12/2014 | Kobayashi | G06F 21/335 726/4 |
| 2015/0029533 A1* | 1/2015 | Sato | G06F 3/1222 358/1.14 |
| 2015/0040188 A1* | 2/2015 | Takeuchi | H04L 63/08 726/3 |
| 2015/0188907 A1* | 7/2015 | Khalid | G06F 21/41 726/8 |
| 2015/0237003 A1* | 8/2015 | Ghai | H04L 61/203 709/220 |
| 2015/0237038 A1* | 8/2015 | Grajek | H04L 67/10 726/8 |
| 2015/0277821 A1* | 10/2015 | Mori | G06F 3/1222 358/1.15 |
| 2015/0341347 A1* | 11/2015 | Kong | H04L 63/0853 726/4 |
| 2016/0021097 A1* | 1/2016 | Shrotri | H04L 63/0815 726/8 |
| 2016/0065563 A1* | 3/2016 | Broadbent | H04L 63/0281 726/9 |
| 2016/0277407 A1* | 9/2016 | Nakashima | H04L 63/102 |
| 2016/0315930 A1 | 10/2016 | Kim et al. | |
| 2017/0026376 A1* | 1/2017 | Matsugashita | H04L 63/0876 |
| 2017/0063871 A1* | 3/2017 | Kashiyama | H04L 63/104 |
| 2017/0163636 A1* | 6/2017 | Nishida | G06F 21/445 |
| 2017/0346856 A1* | 11/2017 | Newell | H04L 63/0815 |
| 2018/0191700 A1* | 7/2018 | Kong | H04L 41/046 |
| 2018/0191701 A1* | 7/2018 | Kong | H04L 63/083 |
| 2018/0330368 A1* | 11/2018 | Slupesky | G06Q 20/38215 |
| 2019/0361636 A1* | 11/2019 | Ren | G06F 3/1287 |

* cited by examiner

APPARATUS, SYSTEM AND METHOD FOR MANAGING AUTHENTICATION WITH A SERVER

BACKGROUND OF THE INVENTION

Field of the Invention

The present invention relates generally to a computing devices, and more specifically, managing and effecting authentication between a computing device and a server.

Description of the Related Art

Image processing devices may include a plurality of different image processing functions. For example, an image processing device may include any one of a multifunction peripheral, copier, scanner, printer, or other image processing device, and provide the corresponding functionality. The image processing device enables a user to execute various functions, features, and user interfaces in order to perform particular tasks. By way of example, the image processing device and/or application executing on the image processing device may provide functionality for making photocopies, printing a document, scanning a document and generating an electronic document representing the scanned document, transmitting data over a network, accessing a database on a remote server, or other task. Image processing devices also are selectively connectable to a network. By connecting to a network, the image processing device may selectively access other external devices including, but not limited to other image processing devices and server computing systems having applications executing thereon. Image processing devices have grown in complexity and have gained the ability to offer many different types of functionality in different environments. This has led to an improvement in the ability to control and operate the image processing devices have been updated to reflect these capabilities. It is not uncommon for image processing devices to have built-in display screens that present various options for controlling the operation of these devices. However, a drawback associated with these configurations relate to the ability to difficulty associated with presenting necessary interfaces for display on the image processing devices to obtain the information needed to access or otherwise acquire information from a server computing system which may then be used by the image processing device. A system according to invention principles remedies any drawbacks associated with these conventional systems.

BRIEF SUMMARY OF THE INVENTION

Methods, systems, and computer-readable media for processing image file data are described.

In one embodiment, an access management system including a server is provided. The server receives, from a client device, a request to log into the server with first information identifying a user that has logged into the client device and second information specifying the client device. The server authenticates the client device using the second information and accesses a service provided by an external apparatus and receive a token for accessing the service. The server associates, in memory, the first information with the received token to enable subsequent access to the service, by the server.

In another embodiment, the server receives, from the client device, a request to access the service provided by the external apparatus and redirects, the client device to the external apparatus enabling the client device to render a user interface for interacting with the service provided by the external apparatus.

In yet another embodiment, the first information includes information used by the user to log into the client device and which is used by the client device to authenticate the user at the client device with an authentication server, wherein the authentication server is different from each of the server and external apparatus, and information identifying a domain of which the user is a member. Additionally or alternatively, first information may include information that identifies an authentication server used to authenticate the user with the client device. In one embodiment, the first information is obtained by a browser executing on the client device from an authentication application used to authenticate the user of the client device.

In another embodiment, the second information is unique to the client device and is used to authenticate the client device with the server.

In a further embodiment, the server receives, from the client device, after successful authentication with the service of the external apparatus, the token for accessing the service.

In another embodiment, the server, in response a request to access the service by the external apparatus, redirects a browser executing on the client device to the external apparatus for authentication.

In another embodiment, the server determines, in response to a request to access the service on the external apparatus, using the first information, whether a token associated with the first information is stored in memory. In a case where it is determined that a token associated with the first information is stored in memory, the server automatically provides the token to the external apparatus and receive from the external apparatus another token usable by the server to access the external service without receiving from a user at the client device, credentials for accessing the external service. In a case where it is determined that a token associated with the first information is not stored in memory, the server causes the service of the external apparatus to be redirected to the client device for authentication therewith.

Another embodiment provides a method for controlling a server as described above.

Yet another embodiment includes a client device for accessing a server to obtain access to an external service. The client device transmits, to a server, a request to log into the server, the request including first information a current user logged into the client device and second information specifying the client device. In to response the server authenticating the client device with the server using the second information and the server accessing an service executing on an external apparatus, the client device receives a token from the external apparatus that is usable to access the service and transmits the received token to the server for storage in association with the first information to enable subsequent access to the service by the client device without providing credentials for the service at the client device.

In a further embodiment an access management system is provided. The system includes an client device, an external apparatus that provides one or more services for use by the client device; and a server. The server receives, from the client device, a request to log into the server with first information identifying a user that has logged into the client device and second information the client device and authenticates the client device with the server using the second information. The server accesses a service provided by an external apparatus and receives a token for accessing the service. The server then associates, in memory, the first information with the received token to enable subsequent access to the service, by the server.

Further features and embodiments will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments and, together with the description, serve to explain the principles of the invention.

DETAILED DESCRIPTION

According to invention principles, a server has a cloud computing application that enables management and delivery of one or more hosted services executing thereon. The cloud computing application enables remote connection with a plurality of different type of devices and enables bidirectional communication between the server and the plurality of different types of devices. The devices may include client devices which are accessing the cloud computing application on the server as well as external apparatuses which are accessed by one or both of the client devices and/or the server and which include various services that are usable by the client device and/or the server. The cloud computing application enables the one or more users to access the application and any services provisioned thereby using any network connected device including computers, servers, smartphones, tablets or the like. The cloud computing application may generally be a control application that serves to manage and direct traffic between the server and any device and/or user accessing the server.

Figure 1:
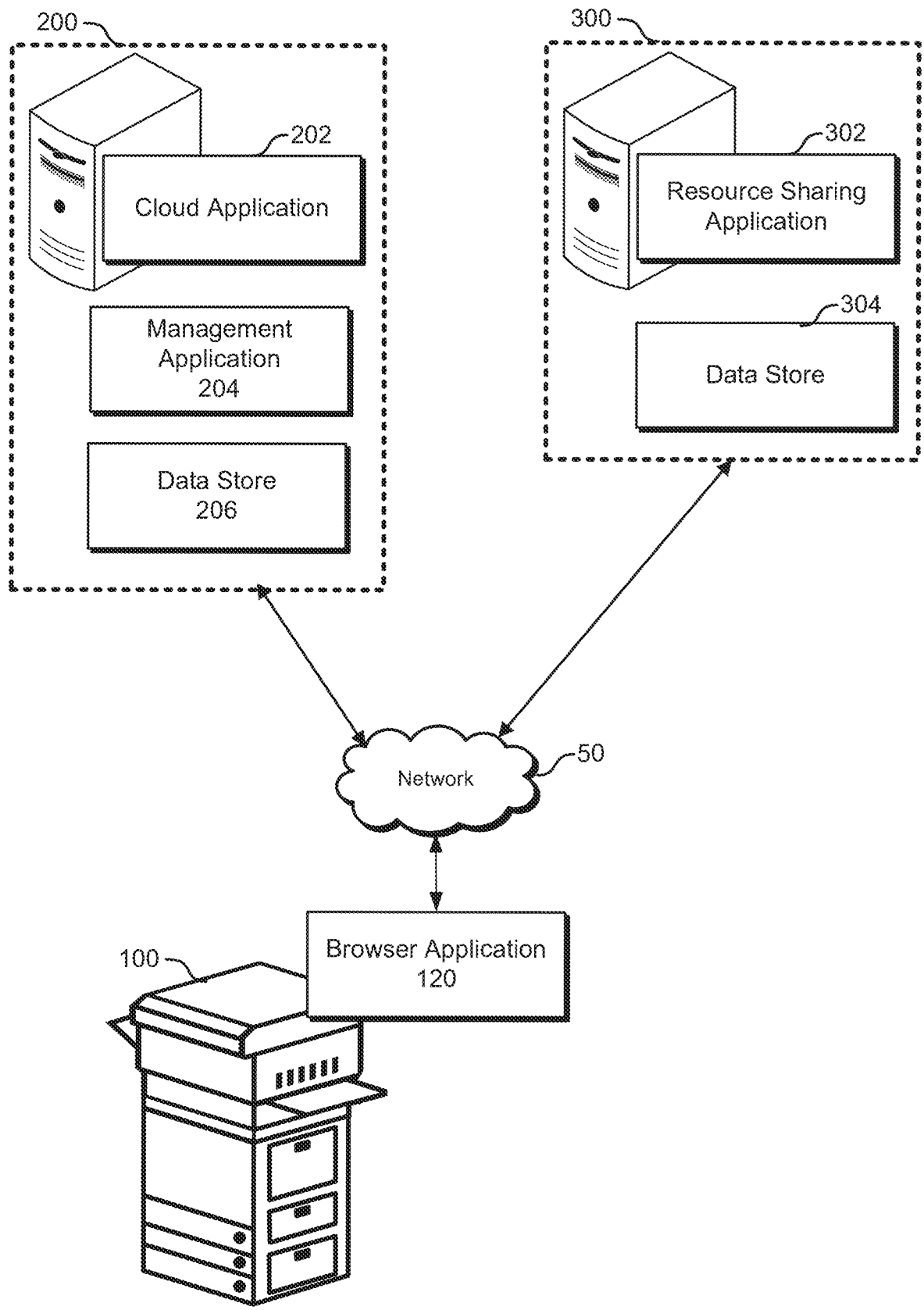
FIG. 1 illustrates an exemplary access management system.

The following is a description of an access management server and system. FIG. 1 illustrates an example network environment 10. The networked environment 10 depicts a client device 100, a first server 200 and a second server 300 each of which are connected to enable bidirectional communication therebetween via communications network 50. This networked environment including the components shown herein are described for purpose of example only and to illustrate the principles of operation. It should be understood that any of the components shown herein may include one or more than one of the respective component. For example, the client device 100 shown in FIG. 1 is an image processing device 100. While the client device 100 is shown as an image processing device, it should be understood that any computing device including, but not limited to, a personal computer, tablet computing device, a smartphone and the like. For purposes of example only, the following description will refer to the client device 100 as an image processing device. Additionally, while only a single client device 100 is shown, it should be understood that embodiments presume a plurality of client devices 100 be interconnected with the first server 200 and/or second server 300. In this embodiment, the network 50 may be any type of communications network that enables bidirectional data communication between one or more devices connected to the network. In one embodiment, network 50 may be the Internet and enable packetized communication of data and messages between the one or more devices on the network. Additionally, the network 50 may also be embodied as a wired network, wireless network or a combination thereof. The network may also incorporate portions of telecommunications networks such as cellular, satellite or other types of communication networks.

In one embodiment, the image processing device 100 includes one or more applications executing thereon which control all operations of the image processing device including but not limited to control operations, operating systems, print functionality, scan functionality, communication functionality and the like. The image processing device 100 further includes a browser application 120. In one embodiment, the browser application 120 may enable a user to display and interact with text, images, form elements, or other information typically located on a web page served by a web server on the World Wide Web or a local area network. The browser 120 may support various types of downloadable, executable, software modules, such as applets or plug-ins. For example, the browser may incorporate a virtual machine configured to execute a program, such as a JAVA applet, embedded in a web page accessed by the browser. The image processing device 100 may have various add-ons, plug-ins, or other extensions for use in or with the browser. In certain other embodiments, the browser 120 may enable the user of the image processing device 100 to communicate with the first or second servers 200/300 to select, obtain, request, process, display and/or other make use of data stored on the first and second servers. In other embodiments, the browser application 120 may enable the user to acquire data from the first server 200 and/or second server 300 and provide that data to another operational unit of the image processing device such as the printing unit to enable output by the printer of the image processing device of the data acquired from the servers 200/300. In some embodiments, the browser 120 may display a collection of text and image elements that are accessible by a user and which enable the user to perform any of the functionality set forth throughout this description.

In another embodiment, the browser application 120 communicates or otherwise cooperates with a control application (not shown) on the image processing device 100 that allows the browser application 120 to directly access information that was used by the use when logging in and authenticating the user with the image processing device 100. In one embodiment, the user information may include one or more of a (a) user identifier that identifies a user with the image processing device; (b) a user identifier that identifies a user with an authentication server; (c) a domain identifier that identifies a domain on which the image processing device is on; (d) a domain identifier that identifies a domain with which a user is authenticated. In another embodiment, the browser application 120 can cooperate with an authentication application that is used for authenticating a user with a domain via an authentication server. In this embodiment, the browser 120 receives, from the authentication application, a unique authentication server identifier that represents the authentication server that has authenticated the user based on the user information input on the image processing device 100.

In another embodiment, the browser application 120 communicates or otherwise cooperates with a control application (not shown) on the image processing device 100 that allows the browser application 120 to directly obtain unique device specific information that specifies or otherwise identifies a particular image processing device 100. In this embodiment, the unique device specific information is different from any information that a user may have input in order to obtain access to one or more of the features and/or applications executing on the image processing device 100. In one example, the device specific information is a device serial number or other unique identifier.

The first server 200, the hardware components of which will be discussed hereinafter with respect to FIG. 3, includes a plurality of applications stored in memory and executed by one or more processors, controllers or processing units thereof. The first server includes a cloud application 202 (operations of which are discussed above) that executes functionality that enables control and communication between the first server 200 and any other device connected thereto such as the second server 300 and/or the image processing device 100. The cloud application 202 presents a digital platform that is output to and accessible by other systems or devices via the network 50. The cloud application 202 may employ rights-based control to allow access thereto. In one embodiment, the rights-based control uses device specific information to determine if access is permitted. In another embodiment, the rights-based control allows users to provide credentials which are validated thereby granting access to the one or more functions provided by the cloud application 202. In one embodiment, a client device 100 (e.g. the image processing device) may be authenticated by the cloud application 202 using a unique device identifier. The second server 200 may also include a management application 204 that selectively manages communication requests from one device on the network 50 to selectively locate and acquire a resource that is included in the request from one or more other devices on network 50. The management application 204 may include a data store for storing information associated with different client devices that have requested access thereto along with information associated with respective users of the client devices and who have logged into client devices (or have otherwise been authenticated to be granted access to the client devices). The management application 204 may also manage and store, in the data store, information about one or more external services that have been requested by the users of the client devices and store access information in association with user information to allow for subsequent access to the one or more external services.

In one embodiment, the image processing device 100 may selectively issue a request for a resource via user interaction with the browser application 120. The management application 204 receives and parses the request to identify the resource being requested. In one embodiment, the resource is an external cloud services application that can store one or more data objects that can be retrieved and used by the image processing device 100 and can also receive data objects created by the image processing device 100. Once the resource is identified, the management application 204 determines a location for the requested resource, for example, via a network address. In this example, the location identified by the initial request may point the management application 204 to access the third server 300 as will be discussed hereinafter. Once the location is identified, the management application 204 may issue a request to acquire the resource from the third server 300. In one embodiment, the resource may be a data file in a particular file format that can be output by a printer on the image processing device. In another embodiment, the resource may be access to an application executing on the third server. In a further embodiment, the resource may be an audio or audio-visual data file stored on the third server 300. Further description of the interaction between the management application 205 and the third server will be described below.

It should be noted that the management application 204 is described as a standalone application for the purpose of example only and to facilitate ease of understanding. It should be understood that the management application 204 may be included in the functionality of the cloud application 202 as a sub-routine or the like.

The second server 200 also may include a data store 206 that is embodied as a storage device which can store different types of data in a defined manner. In some embodiments, information stored in the data store 206 may be grouped and organized hierarchically. Data entries may represent entities, attributes, values or other suitable information. The information in the data store 206 may be grouped in any suitable manner and may be grouped for any suitable reason, such as for implementing task-specific functionality of an application which accesses the stored information. The data store 206 may include all or a portion of one or more data objects to which a file may be attached.

In some embodiments, cloud application 202 and/or management application 204 provides functionality for maintaining and accessing information stored in the data store 206. This may include performing various operations with respect to the data store 206. Examples of operations include adding entries to the data store 206; appending information to data stored in the data store 206; deleting entries from the data store 206; modifying entries in the data store 206; searching for entries in the data store 206; and retrieving entries from the data store 206.

A third server 300 is also shown in FIG. 1. The third server 300 may be a server that executes a resource sharing application 302 that provides access to one or more resources stored thereon. The resource sharing application 302 may provide the functionality of granting access to one or more users who can access one or more types of resources stored in a data store 304. The data store 304 may be of the similar type and provide similar functionality of the data store 206, the description of which is incorporated herein in its entirety.

In one embodiment, the resource sharing application 304 may be a file sharing cloud storage application such DROPBOX, BOX, GOOGLE DOCS, ONEDRIVE. Thus, the resource sharing application may provide a platform that enables users to have private dedicated storage for data files and other information in data store 304 which may be selectively accessible via the network by different types of devices such as computers, servers, smartphones, tablets and like. In other embodiments, an image processing device 100 may also directly access the resource sharing application 304 to request and acquire information stored in the data store 304 of the third server.

In exemplary operation, the management application 204 executing on the second server 200 functions as an intermediary application the manages requests and provisions resources between the image processing device 100 and one or more resources of the third server 300. From the browser 120 of the image processing device 100, a user may select one or more resource from the third server 300 which is to be used by a particular function of the image processing device 100. In one embodiment, the browser 120 may display a webpage generated directly by the resource sharing application 300 which selectively displays the one or more resources in data store 304 that are available to the user at a given time. In another embodiment, the browser 120 may display a webpage generated by the management application 204 which displays, to the user, one or more resources of the third server 300 which are available to the user. In this embodiment, the management application 204 may acquire the information identifying available resources of the third server based on predetermined configuration information provided by a user. For example, when the third server 300 is providing the service of a cloud-based file sharing service (e.g. GOOGLE DOCS), the management application 204 may store user-specific service information that instructs the management application 204 of different servers or systems that host different resources to which a particular user may have access. Thus, a configuration file associated with each user of the cloud application 202 may be stored in data store 206 and include information identifying different types of services offering resources to which the user may have access. This information may include address information identifying a location on a communications network for the service as well as credential information associated with a device and credential information associated with a user to enable access to the service on the third server 300.

In another embodiment, the management application, in the configuration file or another data object, can selectively receive from the third server 300 either directly or by way of redirection from the image processing device, external service access information that enable the cloud application to initially access the external service executing on the third server. The external access information also includes re-access information that allows for the cloud application 202 to request subsequent access to the external service executing on the third server 300. In one embodiment, the external service access information is an access token and the re-access information is a refresh token.

A problem arises in this environment because having to re-enter credential information that is needed to access the resource sharing application 302 on the third server 300 is difficult due to the limited size display device of the image processing apparatus 100. Thus, in an environment with multiple image processing devices 100 at different locations, a user would need to continually re-enter credentials to access the resource sharing application 302. Furthermore, the process required to continually re-authenticate oneself with the third server significantly delays a user's ability to obtain the resource they need from the resource sharing application. The embodiments described herein improve access management technology needed to manage multiple client devices in providing seamless access to one or more resource sharing applications 302 while maintaining the security to prevent unauthorized access to the resource sharing applications 302. As such, this improvement in access management is realized by the management application 204 which advantageously is able to both identify the particular image processing device 100 that is accessing the cloud application 202 to ensure that the particular device is authorized to use the cloud application 202 and obtain unique user information that is associated with a user logging into the image processing device 100 prior to making the request to the cloud application 202 to request access the resource sharing application 302. Once a user is authenticated and determined to be able to use the resource sharing application 302, the management application stores, in a data store, external service access information (e.g. a refresh token) and one or more pieces of user information that was used to log into the image processing device and which can uniquely identify the particular user. Thus, by receiving device specific information and user specific information in a request to the cloud application 202, the cloud application 202 can make use of the user specific information to query the data store to determine if external service access information is stored in association with the user specific information contained in the query. If an association exists, the management application causes the cloud application 202 to issue the external access information to the resource sharing application 302 on the third server 300 which then reissues the primary access information (e.g. access token) to the management application 204 which causes the cloud application to provide one or more user interfaces that enable the image processing device 100 to make use of the features of the one or more resource sharing applications 302.

Figure 2:
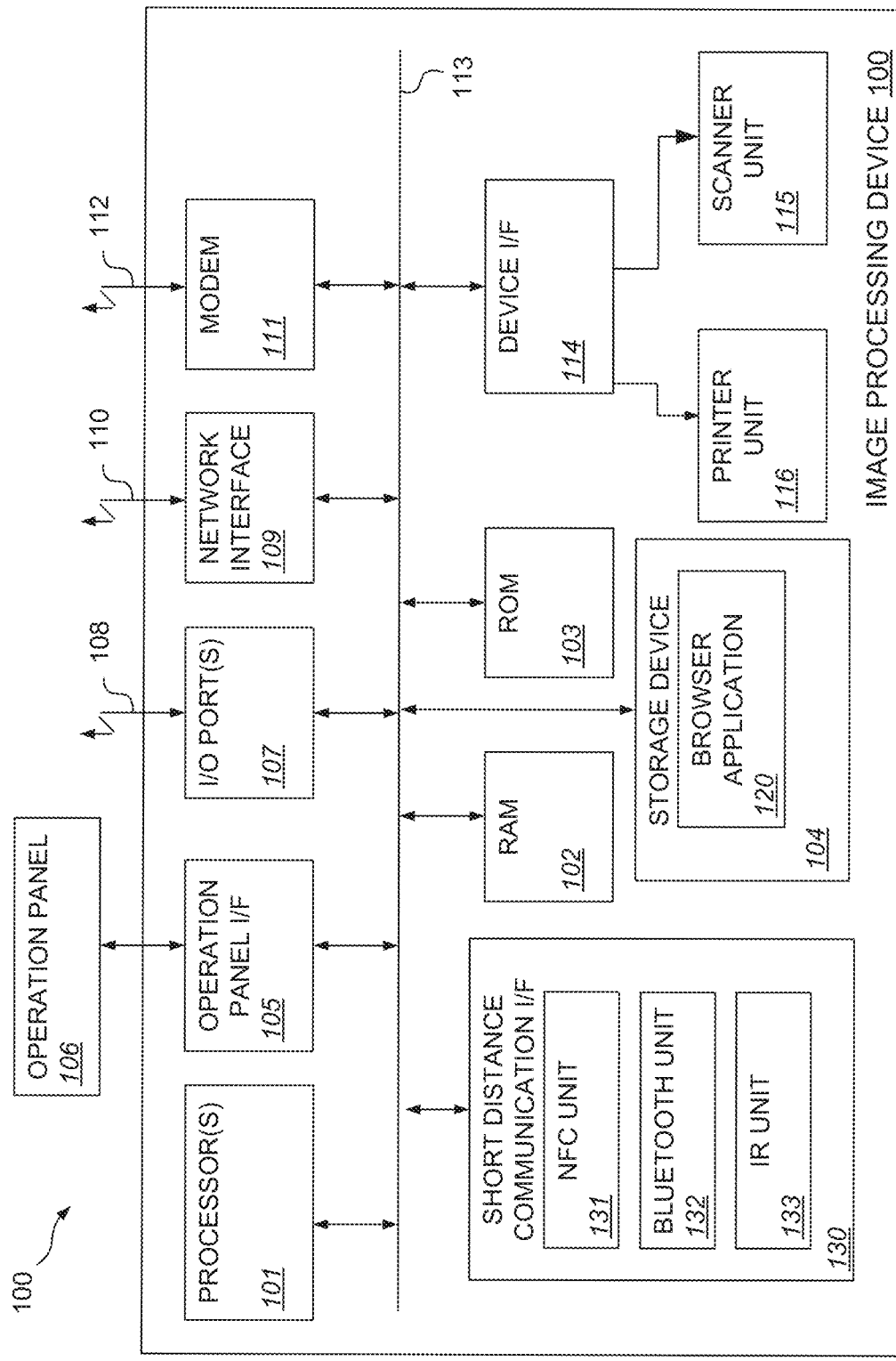
FIG. 2 is a block diagram depicting the components of a client device.

An exemplary client device 100 depicted as an image processing device 100 is illustrated in FIG. 2. The image processing device 100 may be a multifunction peripheral having a scanning function in addition to printing, copying and other functions. However, it will be understood that various other implementations of an image processing device are within the scope of the present invention. For example, various components, modules, functions, and/or configurations of the image processing device 100 of FIG. 1 could be combined, deleted, or modified to form further implementations. Further by way of example, in some embodiments, other devices (for example, other devices having scanning capabilities) and/or servers (for example, a computer connected to a scanner) may be implemented as the image processing device 100. Every time the user attempts to access the resource sharing application 302 from a different image processing device, a user would need to re-enter credential information. The system described herein improves the ability for subsequent access of external services by combining into a request for accessing the external services, first information that was input by a user and used to grant access to the user of the image processing device and second information that uniquely identifies the image processing device 100 so that the cloud application 2020, through which the request for the external service is provisioned, can store uniquely identifying user information with external service access information for subsequent access to the external service.

FIG. 2 illustrates the hardware components of the image processing device 100 shown and discussed in FIG. 1. The image processing device 100 includes one or more processor(s) 101. The processor(s) 101 include a central processing unit (CPU) that performs overall control functions for the image processing device 100. The CPU uses a random access memory (RAM) 102 as a work area while executing instructions. The CPU executes instructions of various programs stored in one or more memory devices 104. For example, the CPU executes programs stored in a read only memory (ROM) 103 and in a storage device 104.

In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the image processing device 100. The processor(s) 101 perform or cause components of the image processing device 100 to perform various operations and processes described herein, in accordance with instructions stored in one or more memory devices 104.

The RAM 102 is used as a work area when the processor(s) 101 execute various instructions, such as those making up computer programs stored in the ROM 103 and/or the storage device 104. The RAM 102 may be used as a temporary storage area for various data, including input image data and data created by an application executing on the image processing device 100 or data received from one or more mobile computing devices 200 which is then further processed by one or more applications executing on the image processing device 100. The RAM 102 may be used as a cache memory. In some embodiments, the RAM may be dynamic RAM (DRAM) or static RAM (SRAM).

The ROM 103 stores data and programs having computer-executable instructions for execution by the processor(s) 101. In some embodiments, the ROM 103 is a boot ROM, storing instructions for the booting process. In some embodiments, the ROM 1203 may be flash memory. In certain instances, the ROM 103 may include an operating system for controlling the operation of the image processing device 100. In this case, an operating system application stored in ROM 103 (or alternatively stored in the storage device 104 and accessible once the boot routine of the image processing device 100 is completed), contains a catalog of other applications executing on the image processing device and provide information about such other executing applications to one another enabling interoperation there between.

An operation panel interface 105 provides output signals to and receives input signals from an operation panel 106. Regarding the output signals, the operation panel interface 105 provides GUI data to the operation panel 106 for display on a display device such as liquid crystal display (LCD) or an light emitting diode display (LED). Regarding the input signals, the operation panel interface 105 receives input signals based on user input operations at the operation panel 106 and relays the input signals to the processor(s) 1201. In some embodiments, the operation panel 106 includes a touch sensitive element operable to receive user input operations or commands based on the touching of graphical objects displayed on the display. In some embodiments, the operation panel 106 includes a hard key panel.

The image processing device 100 includes one or more input/output (I/O) port(s) 1207. The I/O port(s) 107 may include any suitable interface type such as a universal serial bus (USB) port, FireWire port (IEEE-1394), serial port, parallel port, or AC/DC power connection port. The I/O port(s) 107 enable one or more external device(s) 108 to communicate with the image processing device 100 when the external device(s) 108 is/are connected to the I/O port(s) 107.

A network interface 109 includes hardware, software, or both providing one or more interfaces for communication (such as, for example, packet-based communication) between the image processing device 100 and one or more other servers or one or more networks 110. As an example and not by way of limitation, the network interface 109 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 109 for it. As an example and not by way of limitation, the image processing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 100 may communicate with a wireless PAN (WPAN) (such as, for example, a BLUETOOTH WPAN), a WI-FI network, a WI-MAX network, or other suitable wireless network or a combination of two or more of these. The image processing device 100 may include any suitable network interface 109 for any of these networks 110, where appropriate.

A system bus 113 interconnects various components of the image processing device 100 thereby enabling the transmission of data and execution of various processes. The system bus 113 may include one or more types of bus structures including a memory bus or memory controller, a peripheral bus, and a local bus using any of a variety of bus architectures.

The device interface 114 is connected to the scanner unit 115 and to the printer unit 116. The device interface 114 performs synchronous/asynchronous conversion of image data.

The scanner unit 115 includes a light source and an image sensor. The scanner unit 115 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 115 includes an optical system (for example, mirrors, lens) that directs the light to the image sensor. After the image sensor generates the electrical signals, an analog-to-digital converter converts the electrical signals to digital image data representing the scanned physical document. The scanner unit 115 then outputs the digital image data to one or more other components of the image processing device 100 via the device interface 114.

The printer unit 116 is an image output device for printing on a sheet an image corresponding to image data. In response to a print command received at the image processing device 100, the printer unit 116 receives image data via the device interface 114 and outputs to a sheet an image corresponding to the image data.

Image processing device 100 may also include a short distance communication interface (I/F) 130. The short distance communication interface 130 facilitates communication between one or more applications executing on the image processing device 100 and at least one mobile computing device 200 using one or more short distance communication protocols. Thus, the short distance communication interface 130 includes a near field communication unit 131 (for example, an NFC reader) enabling bidirectional communication with a mobile computing device having NFC functionality. The NFC unit 131 includes circuitry and software that enables transmission (writes) and reception (reads) of commands and data with a non-contact type device using a short distance wireless communication technique such as NFC (Near Field Communication; ISO/IEC IS 18092). In other embodiments, the short distance communication interface 130 may also include a BLUETOOTH communication unit 132 that includes a transceiver capable of transmitting and receiving data via short wavelength radio waves ranging in frequency between 2.4 GHz and 2.485 GHz. In other instances, the short distance communication interface 130 may also include an infrared (IR) unit that can emit and sense electromagnetic wavelengths of a predetermined frequency have data encoded therein. Furthermore, while not specifically shown, the short distance communication interface may also include a smart card reader, radio-frequency identification (RFID) reader, device for detecting biometric information, a keyboard, keypad, sensor(s), a combination of two or more of these, or other suitable devices.

The depiction of the short distance communication interface 130 is done merely to facilitate the understanding of the operation of the present arrangement and it should be understood that the short distance communication interface 130 may also be embodied as part of the I/O ports 107 and/or the network interface 109. Alternatively, an image processing device 100 for use in accordance with invention principles need not contain any short distance communication circuitry.

A storage device 104 stores application data, program modules and other information. One or more program modules stored in the storage device 104 are configured to cause various operations and processes described herein to be executed. The storage device 104 also stores other programs and data to be processed. For example, the storage device 104 stores an operating system including programs and data for managing hardware and software components of the image processing device 100. Applications on the image processing device 100 may utilize the operating system to perform various operations. The storage device 104 may further store other programs and/or drivers that enable various functions of the image processing device 100, graphical user interface (GUI) functions, and/or processor functions. The storage device 104 may also store data files including, for example, image data, user data, configuration information, GUI components, such as graphical elements or templates, or other data required by the image processing device 100.

In some embodiments, the image processing device 100 includes one more applications including one or more programs for controlling access to one or more resources on the image processing device 100. In some embodiments, applications stored in the storage device 104 includes one or more programs for controlling access to one or more applications (or particular functionality thereof) executing on the image processing device 100.

In some embodiments, access to one or more resources of the application is controlled based on a credential associated with the entity attempting to access the one or more resources of the application. Policies for controlling access to various resources of the application may be stored at the image processing device 100. In other embodiments, access control policies may reside in a centralized or enterprise server remotely located from the image processing device 100. Once access to an application is granted, a user gains access to one or more resources of the application, including task-specific functionality of the application. The task-specific functionality of the application may enable the user to perform one or more tasks using the application. For example, the application 100 may provide various functions, features and user interfaces for processing image data, transmitting data over a network, managing one or more databases, or other tasks. In some embodiments, the application 100 is configured to use one or more resources of the image processing device 100 to perform a process in response to an instruction from the user.

An application executing on image processing device 100 may use functionality of and/or information on the image processing device 100 to employ hardware, software, or both for that provides scanning functionality. For example, the image processing device 100 may include an image sensor or a camera for capturing an image.

In certain embodiments, the application executing on the image processing device 100 provides communication functionality for transmitting image file (or other electronic document data file format) via the network 50 to any other computing system and/or server 200/300 connected thereto. The communication functionality of the application may be implemented by interaction with the network interface 109 which converts data into a transmissible data form able to be communicated over a network 50 to server 200/300 (or other computing system). In addition to, or instead of using the network interface 109, application functionality that requires transmission of data may be performed using the short distance communication interface 130 (including any and all types of short distance communication described herein). The application may also enable the image processing device 100 to receive instruction data from other systems on the network 50 enabling access to and control of any functionality provided by application. The receipt of data from the server 200/300 or other computing device may similarly occur using any of the network interface 109, short distance communication interface 130 or the like. The communication functionality of application may also enable the image processing device 101 to receive and process data objects generated by any system connected to the image processing device 101 via the network 50.

In some embodiments, the application executing on the image processing device 100 provides functionality for maintaining and accessing information in a data structure, which may be any suitable data structure for organizing data. For example, information associated with a user or process may be added as one or more entries into a data structure. The application executing on the image processing device 100 may store and/or retrieve data in a memory or on a hard disk of the image processing device 100. In some embodiments, the image processing device 100, when executing the application, may perform various operations with respect to a data store. Examples of operations include adding entries to a data store; deleting entries from a data store; modifying entries in a data store; searching for entries in a data store; and retrieving entries from a data store. The data store management functionality provided by application discussed above is also applicable to data stores located on remote computing systems and/or servers connected to the image processing device 100 via the network 50.

The application executing on the image processing device 100 may provide functionality for generating information and providing the information to a user interface of the image processing device 100 displayed on operation panel 106. The information may include text, images, form elements, files, executable programs, or other suitable information. The information provided by the application may include content for display on a display of the image processing device 101.

In another embodiment, the storage device 104 stores a browser application 120. The browser application 120 may enable a user to display and interact with text, images, form elements, or other information typically located on a web page served by a web server on the World Wide Web or a local area network such as one hosted on one of the first server 200 or second server 300. The browser may support various types of downloadable, executable, software modules, such as applets or plug-ins. For example, the browser may incorporate a virtual machine configured to execute a program, such as a JAVA applet, embedded in a web page accessed by the browser. The image processing device 100 may have various add-ons, plug-ins, or other extensions for use in or with the browser. In certain other embodiments, the browser may enable the user of the image processing device 100 to communicate with the first or second servers to select, obtain, request, process, display and/or other make use of data stored on the first and second servers. In other embodiments, the browser application 120 may enable the user to acquire data from the first server 200 and/or second server 300 and provide that data to another operational unit of the image processing device such as the printing unit to enable output by the printer of the image processing device of the data acquired from the servers 200/300. In some embodiments, the browser 120 may display a collection of text and image elements that are accessible by a user and which enable the user to perform any of the functionality set forth throughout this description.

In some embodiments, the image processing device 100 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 100. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

In another embodiment, the image processing device 100 may be accessed and operated using an external computing device. In some embodiments, the external; computing device may be a smartphone. In other embodiments, the external computing device may be a tablet computing device. Accessing the image processing device 100 via an external computing device may allow a user to have the GUI generated by the operation panel interface 105 output onto a screen of the external computing device. Connection between the image processing device 100 and any external computing device may occur via the network interface 109 and/or the short distance communications interface 130.

Figure 3:
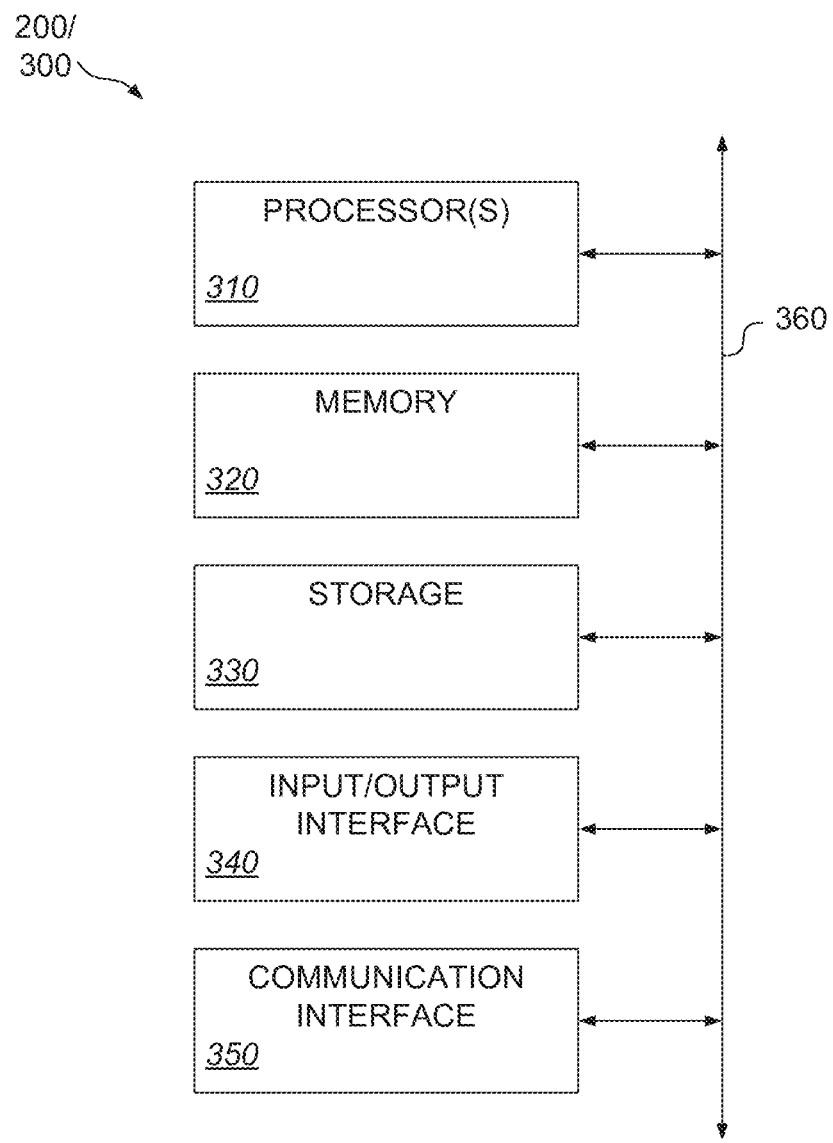
FIG. 3 is a block diagram depicting the components of a computing system.

FIG. 3 illustrates the hardware components of an exemplary first server 200 and/or second server 300 (or any other computing system) with which the image processing device 100 may communicate. According to various embodiments, all or a portion of the description of the server is applicable to all or a portion of one or more of the first server 200 or the second server 300.

The term server (or computing system) as used herein includes but is not limited to one or more software modules, one or more hardware modules, one or more firmware modules, or combinations thereof, that work together to perform operations on electronic data. The physical layout of the modules may vary. A server may include multiple computing devices coupled via a network. A server may include a single computing device where internal modules (such as a memory and processor) work together to perform operations on electronic data. Also, the term resource as used herein includes but is not limited to an object that can be processed at a server. A resource can be a portion of executable instructions or data.

In some embodiments, the server 200/300 performs one or more steps of one or more methods described or illustrated herein. In some embodiments, the server 300 provides functionality described or illustrated herein. In some embodiments, software running on the server 200/300 performs one or more steps of one or more methods described or illustrated herein or provides functionality described or illustrated herein. Some embodiments include one or more portions of the server 200/300.

The server 200/300 includes one or more processor(s) 310, memory 320, storage 330, an input/output (I/O) interface 340, a communication interface 350, and a bus 360. The server 200/300 may take any suitable physical form. For example, and not by way of limitation, the server 200/300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 310 include hardware for executing instructions, such as those making up a computer program. The processor(s) 310 may retrieve the instructions from the memory 320, the storage 330, an internal register, or an internal cache. The processor(s) 310 then decode and execute the instructions. Then, the processor(s) 310 write one or more results to the memory 320, the storage 330, the internal register, or the internal cache. The processor(s) 310 may provide the processing capability to execute the operating system, programs, user and application interfaces, and any other functions of the server 200/300.

The processor(s) 310 may include a central processing unit (CPU), one or more general-purpose microprocessor(s), application-specific microprocessor(s), and/or special purpose microprocessor(s), or some combination of such processing components. The processor(s) 310 may include one or more graphics processors, video processors, audio processors and/or related chip sets.

In some embodiments, the memory 320 includes main memory for storing instructions for the processor(s) 310 to execute or data for the processor(s) 310 to operate on. By way of example, the server 200/300 may load instructions from the storage 330 or another source to the memory 320. During or after execution of the instructions, the processor(s) 310 may write one or more results (which may be intermediate or final results) to the memory 320. One or more memory buses (which may each include an address bus and a data bus) may couple the processor(s) 310 to the memory 320. One or more memory management units (MMUs) may reside between the processor(s) 310 and the memory 320 and facilitate accesses to the memory 320 requested by the processor(s) 310. The memory 320 may include one or more memories. The memory 320 may be random access memory (RAM).

The storage 330 stores data and/or instructions. As an example and not by way of limitation, the storage 330 may include a hard disk drive, a floppy disk drive, flash memory, an optical disc, a magneto-optical disc, magnetic tape, or a Universal Serial Bus (USB) drive or a combination of two or more of these. In some embodiments, the storage 330 is a removable medium. In some embodiments, the storage 330 is a fixed medium. In some embodiments, the storage 330 is internal to the server 200/300. In some embodiments, the storage 330 is external to the server 200/300. In some embodiments, the storage 330 is non-volatile, solid-state memory. In some embodiments, the storage 330 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 330 may include one or more memory devices. One or more program modules stored in the storage 330 may be configured to cause various operations and processes described herein to be executed.

The I/O interface 340 includes hardware, software, or both providing one or more interfaces for communication between the server 200/300 and one or more I/O devices. The server 200/300 may include one or more of these I/O devices, where appropriate. One or more of these I/O devices may enable communication between a person and the server 200/300. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 340 includes one or more device or software drivers enabling the processor(s) 310 to drive one or more of these I/O devices. The I/O interface 340 may include one or more I/O interfaces.

The communication interface 350 includes hardware, software, or both providing one or more interfaces for communication (such as, for example, packet-based communication) between the server 200/300 and one or more other servers or one or more networks. As an example and not by way of limitation, the communication interface 350 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 350 for it. As an example and not by way of limitation, the server 200/300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the server 200/300 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. Additionally the communication interface may provide the functionality associated with short distance communication protocols such as NFC and thus may include an NFC identifier tag and/or an NFC reader able to read an NFC identifier tag positioned with a predetermined distance of the computing device. The server 200/300 may include any suitable communication interface 350 for any of these networks, where appropriate. The communication interface 350 may include one or more communication interfaces 350.

The bus 360 interconnects various components of the server 200/300 thereby enabling the transmission of data and execution of various processes. The bus 360 may include one or more types of bus structures including a memory bus or memory controller, a peripheral bus, and a local bus using any of a variety of bus architectures.

Exemplary operation of certain embodiments will be discussed hereinbelow with respect to FIGS. 4-9. The access management system advantageously resolves issues that are associated with accessing or more services via a cloud service application when the authorization mechanisms for authorizing user of the cloud application is different than the authorization mechanism needed to grant access to an external service that is accessible via the cloud service application. More specifically, the following embodiments advantageously provide two different types of information that (1) uniquely identifies the client device so that the client can be authorized to use the cloud service application and (2) uniquely identifies the user (e.g. information associated with user obtaining access to the client device before any request is made). This advantageously allows for access information needed to access the requested service to be stored in association with user specific information and not the device specific information. Were access information be associated with device information, anytime that device attempts to access the external service, access that is associated with a user specific account would be provided. This is problematic because multiple users may use the same device and desire access to the external service. This problem is resolved by storing the access information for accessing the external service with the user information that was used to log into the client device. In this manner, when logging into a different device that is also able to access the cloud service application, the user can re-access the external service without re-entering external service login information and going through multiple authentication cycles each time external service access is required. Furthermore, because the external service access information is stored in association with the user specific information in a data store of the cloud server and not on the client device, there is no chance for the client device, when a different user requests access to the external service, to inadvertently transmit external service access information (e.g. a refresh token) and improperly gain access to a user account that is not theirs.

Figure 4:
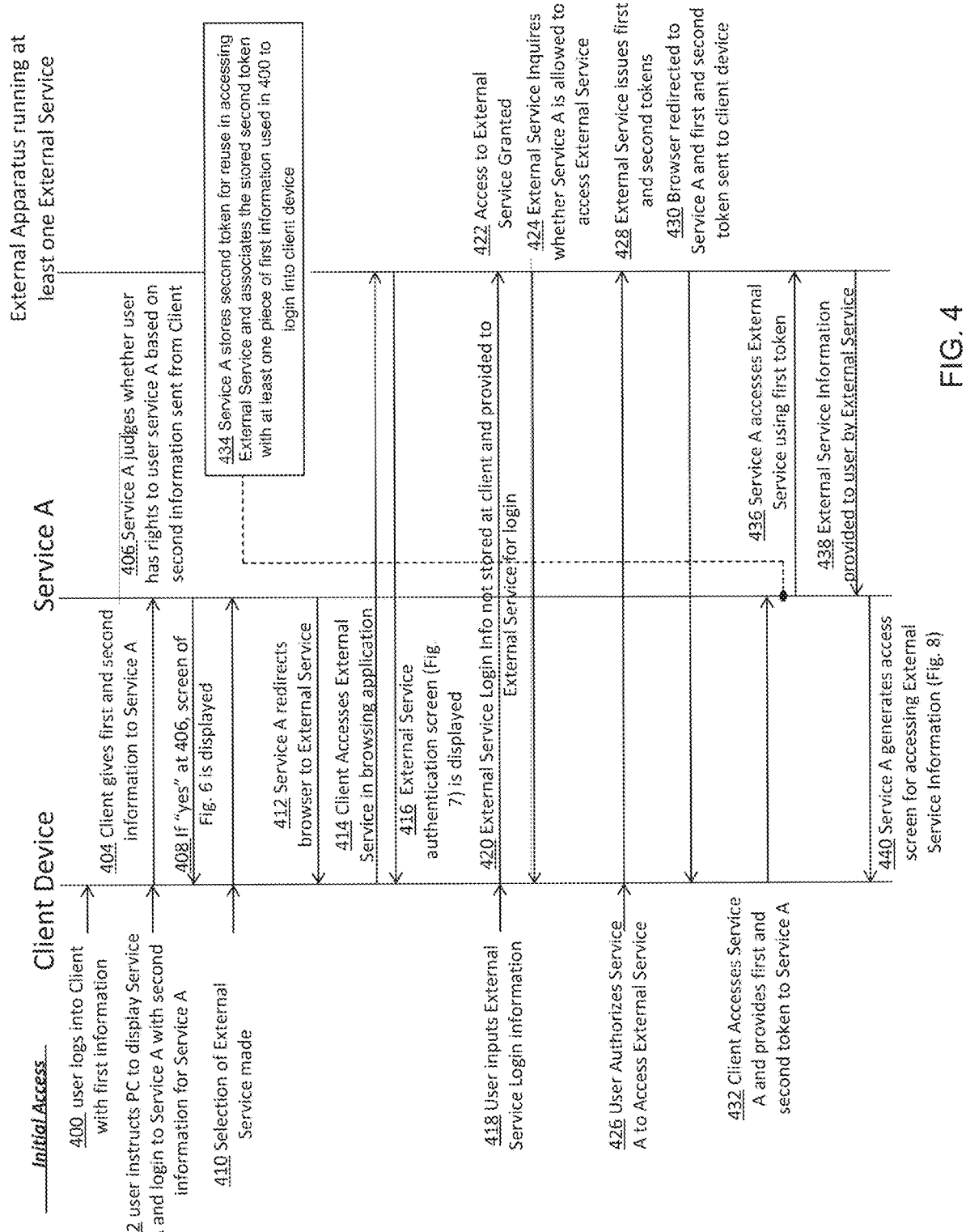
FIG. 4 is a sequence diagram detailing operation of the access management system.

FIG. 4 is a sequence diagraming detailing an algorithm of the device access management system. The system includes a client device which is requesting, via a Service A (e.g. cloud service application 202 in FIG. 1), access to an external service provided by an external apparatus (e.g. resource sharing application 302 in FIG. 1). At 400, a user logs into a client device with first information. In one embodiment, the first information includes one or more of (a) user identifier, (b) a password and (c) domain identifier identifying the user's domain. Once the user is authenticated or otherwise permitted to access one or more resources of the client device, the client device generates a user interface that enables a user to select Service A which indicates that the user would like the client device to access Service. The user interface is generated in response to user request in 402 which begins the login (or other authorization processing) to determine if the client device is able to access Service A. Further, in 402, the request to access Service A includes a browser application on the client device obtaining from the client device second information that is device specific (e.g. serial number or other unique device identifier). Thereafter, the first and second information is combined into the request and provided to Service A in 404. In one embodiment, the first information included in the request is obtained from the browser application that cooperates with one or more other control applications executing on the client device. In this embodiment, when the user logs into the client device in 402, information that uniquely identifies a device that authenticates the user to be able to access the client device is obtained and included as part of the first information. For example, an authorization server identifier such as a GUID that uniquely identifies the authorization server that authorizes user access to the client device is obtained and included as part of the first information for use as will be described in 434 below.

In 406, Service A judges whether the client device has rights to access Service A using the second, device-specific information such as a device serial number. In one embodiment, in 406, Service A compares a device identifier to set of authorized device identifiers stored in a data store which indicate client devices that are able to access Service A. At this point Service A generates a temporary data object including the first information and stores the temporary data object in memory for later retrieval and use. Upon determining, by Service A, that the client device is authorized to use one or more features of Service A due to matching the device specific information within the set of authorized device identifiers, Service A generates a user interface in 408 which enables a user to select one or more external services that the client device may access via Service A.

Figure 6:
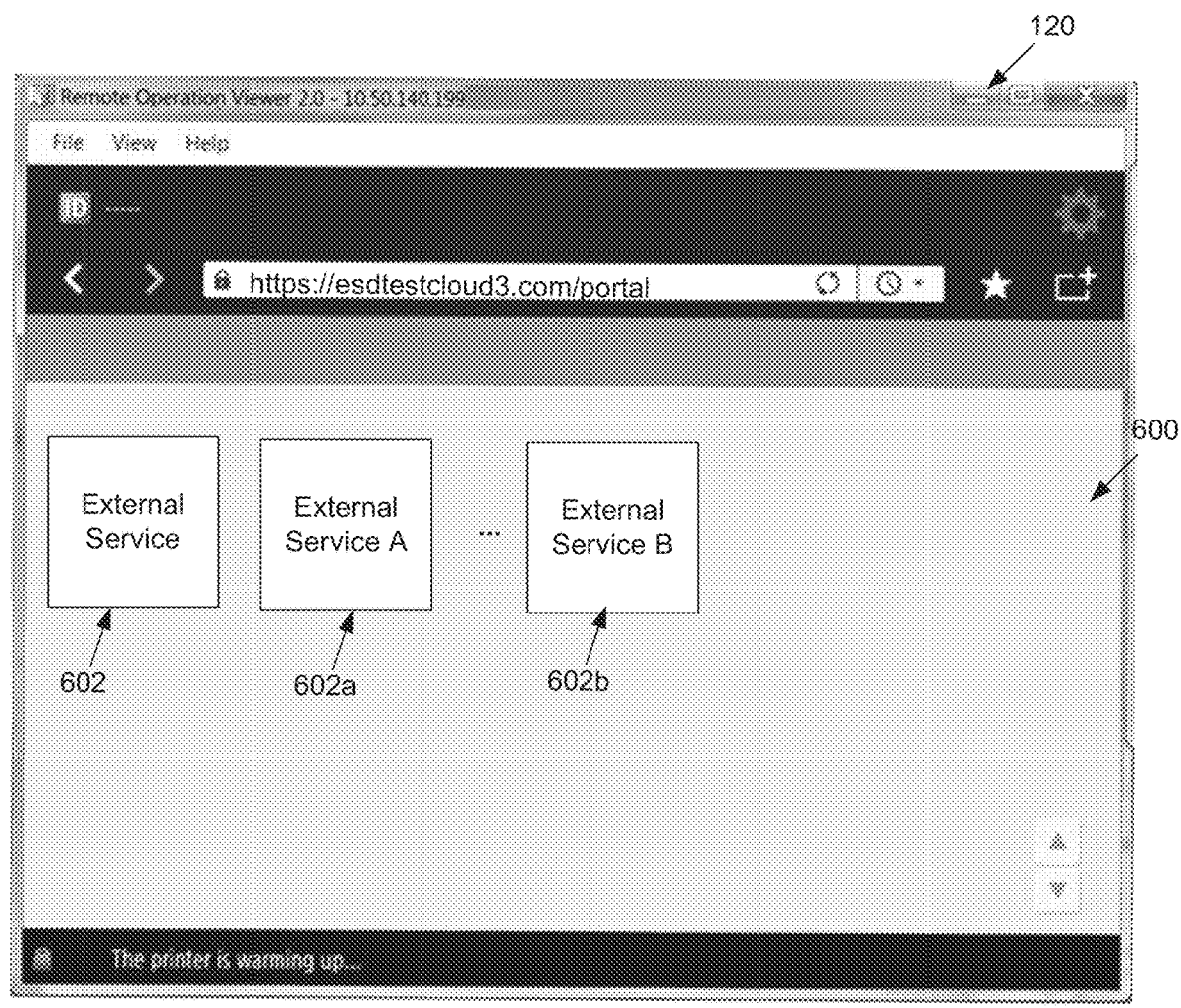
FIGS. 6-9 are exemplary user interfaces.

An exemplary UI 600 generated by Service A in 408 and provided to the client device is shown in FIG. 6. The UI 600 is rendered within a window of the browser application 120 and includes one or more user selectable image elements 602, 602a and 602b each indicative of different external services that may be accessed via Service A which serves as an intermediary application in the cloud. These external services require different log in credentials in order to gain access thereto and need to be separate authorized to enable Service A to access the external services and provide these external services to the client device.

In 410, a user selects an external service from a set of external services displayed within the UI of FIG. 6. In one embodiment, the client device includes a touch-sensitive display enabling the user to select the desired external service. However, this is for purposes of example only and any user selection method may be employed such as cursor-based selection and voice-based selection whereby the client device includes a microphone to receive audible output from a user and processing software that translates the received audible output into commands that cause the external service to be selected.

The selection made in 410 is provided to Service A which receives the selection and redirects the browser on the client device in 412 to the selected external service via a redirect link which allows the user to access the external service within the browser of the client device in 414. In 416, an authorization page generated by the external service is provided to the client device to request that the user enter external service authentication information (e.g. username/password) that grants access to the user's account at the external service. An exemplary user interface displayed in 416 is shown in FIG. 7.

Figure 7:
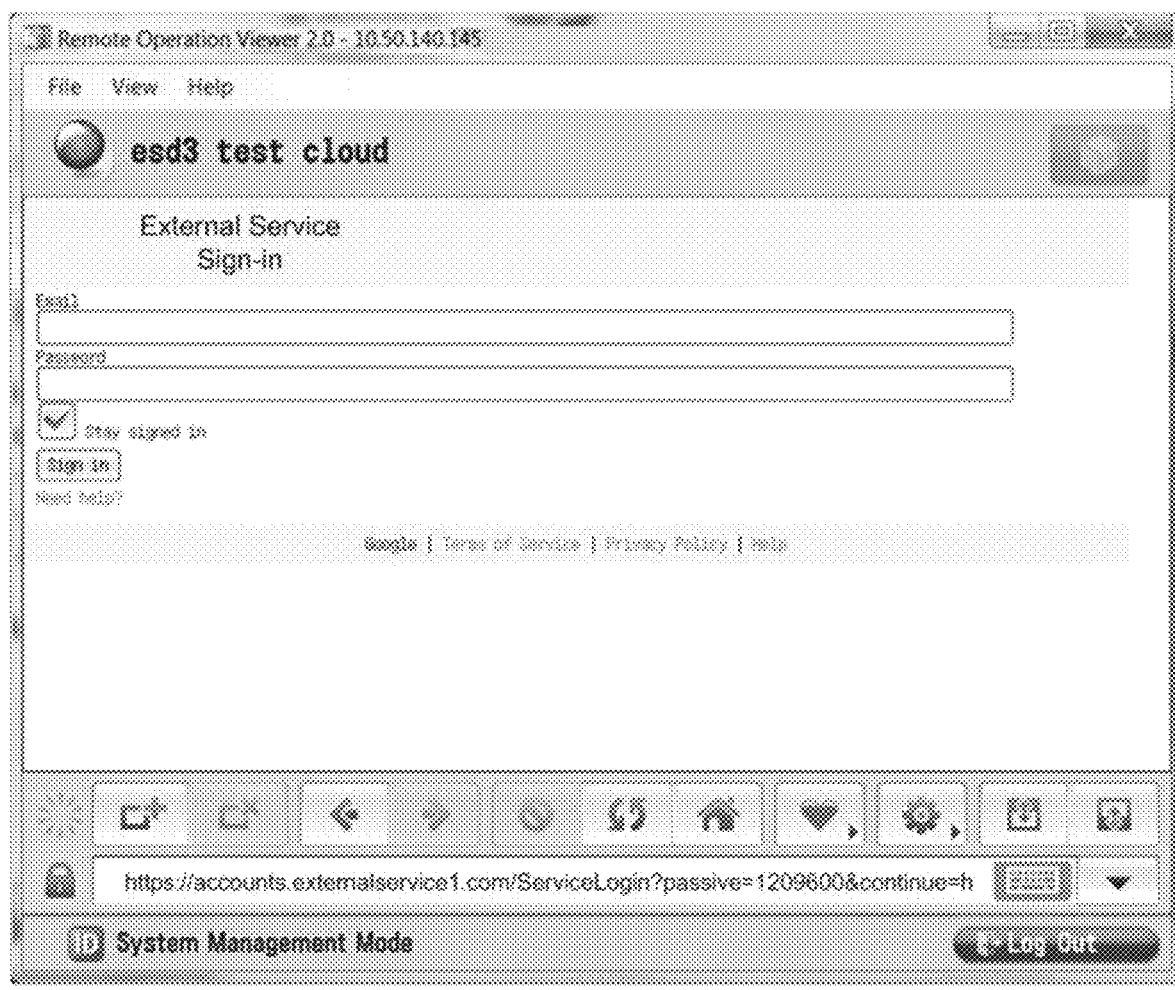
Figure 8:

At 418, the user inputs external service authentication (e.g. login information) into the particular fields within the UI of FIG. 7 which is then transmitted, without being stored at the client device, to the external service for login processing in 420. Upon successful login challenge, the user who is currently logged into the client device is granted access to the external service in 422. The External service issues a request to grant Service A permission to access the user's account on the external service in step 424 as shown in the UI of FIG. 8. From within the UI of FIG. 8, the user can selectively authorize Service A to access the external service in 426. Once authorized, the external service issues, in 428, first and second tokens enabling Service A to access the external service. In one embodiment, the first token is an access token that is used to indicate that the device can access the external service and the second token is a refresh token which can be used for subsequent access by Service A to request an access token that is valid after a previous one has expired.

At 430, the external service redirects the browser on the client device to Service A and the first and second tokens are provided to the client device and back to Service A in 432 via a redirect. In 434, once Service A receives the first and second tokens, Service A accesses the data object storing the user specific information and stores, in a data store, the second (refresh) token in association with the user specific information. In 434, at least one piece of the first information is associated with the refresh token. In one embodiment, a user identifier and domain are associated with the refresh token. The association advantageously enables Service A of the cloud application to provide subsequent access to the external service without going through 412-434. This also advantageously resolves problems associated with subsequent access to services when there are different login schemes used in a particular environment.

Figure 9:

At 436, after the second token is stored in association with user-specific information, Service A accesses the external service via the first token which provides the external service to Service A in 438. Service A subsequently generates a UI in 440 and provides the UI to the client device for rendering in the browser thereof. An exemplary UI generated in 440 which enables the user of a client device to access a respective external service is shown in FIG. 9. In this exemplary embodiment, the external service is a cloud storage provider that enables a user to store data files and retrieve one or more data files that have previously been stored.

Figure 5:
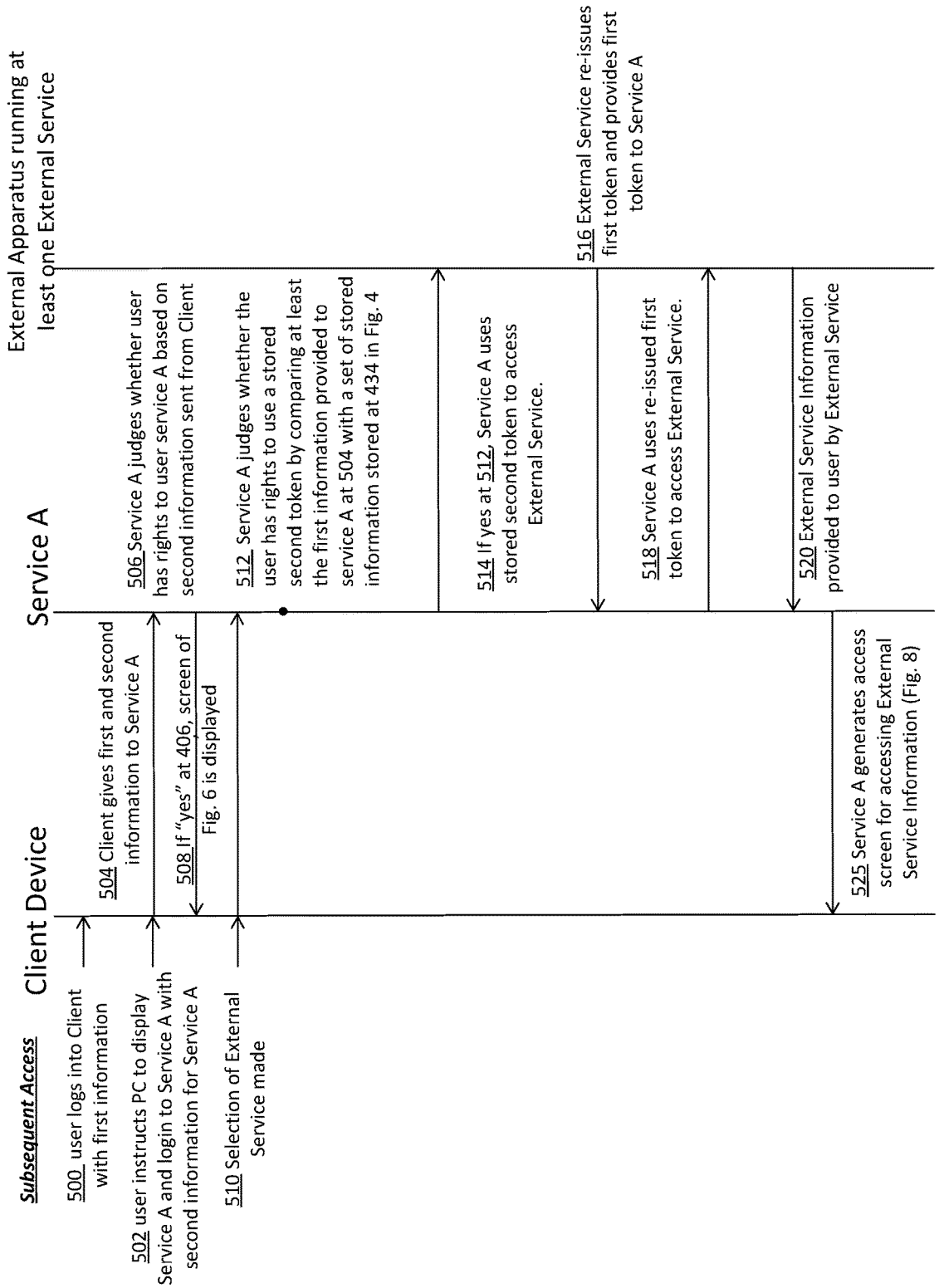
FIG. 5 is a sequence diagram detailing operation of the access management system.

FIG. 5 is a sequence diagram detailing another aspect of the access management system. More specifically, the sequence diagram of FIG. 5 details the processing associated with subsequently accessing the external service from a client device which may or may not be the same client device used for initial access in FIG. 4. FIG. 5 includes blocks 500-510 which are substantially similar to 400-410 in FIG. 4, the description of which need not be repeated.

In 512, once Service A has received a selection indicating an external service to be accessed by the client device, Service A judges whether the user who logged into the client device has rights to use a stored refresh token thereby eliminating the need to proceed through 412-436 of FIG. 4. The determination in 512 is made by retrieving previously stored first information values received in 504 and comparing one or more types of first information with values of first information stored in association with different refresh tokens in the data store. When a match of values for a predetermined number of types of first information is found to be associated with a refresh token, the determination indicates that the specific user of the client device is owner of the account at the external service and that Service A has authorization to provide the external service to the client device.

In 514, a "yes" result in 512 causes Service A to retrieve the refresh token stored in the data store and provide it to the external service to request an access token. The requested access token made using the refresh token re-issued and provided to Service a in 516. Service A then uses the re-issued access token received in 516 to request access to the external service in 518. The external service information is provided to Service A in 520 which generates the UI such as the one illustrated in FIG. 8 in 525. The UI enables the user at the client device to interact with and make use of the services provided by the external apparatus.

Figure 10:
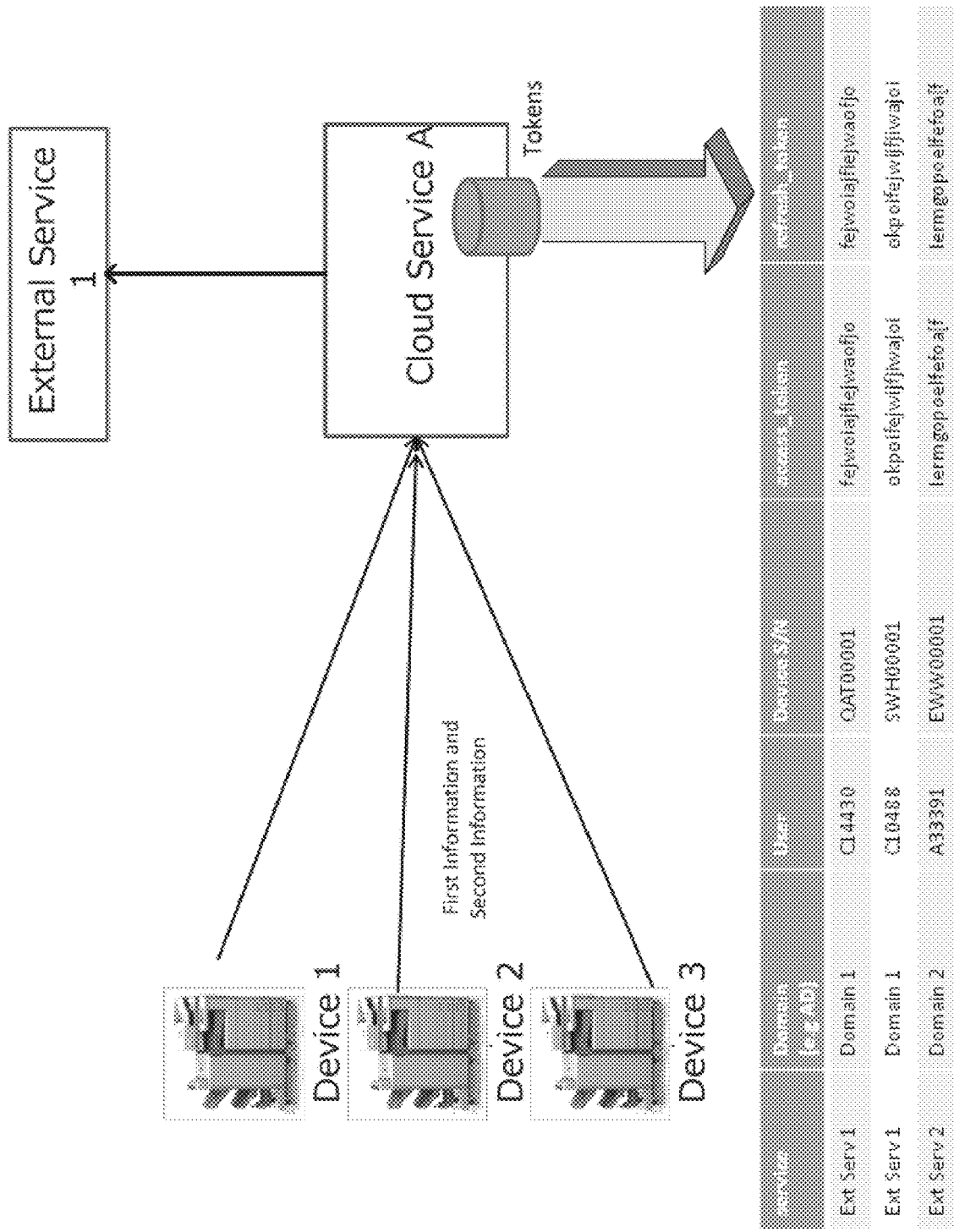
FIG. 10 illustrates an exemplary operational environment.

FIG. 10 is a schematic illustration of the access management system. In the embodiment shown in FIG. 10, the client environment includes three client devices (Device 1, Device 2 and Device 3), each of which are image processing devices including elements described hereinabove with respect to FIG. 2. A user can seek to gain access a respective one of the devices as discussed in FIG. 4 and/or FIG. 5 in order to make a request to a cloud service to gain access to External service. This environment advantageously enables authorization of any of Devices 1-3 using device specific information which is the preferred mode of authorizing devices used by the cloud service. Further, after the user of a respective device has granted the cloud service permission to access the external service as discussed above in FIG. 4, the refresh token is stored by cloud service in a data store. The data store 1012 includes a data structure that associates a particular external service and at least two types of user specific information received in the request and the device specific information of the request with both access tokens and refresh tokens. In this embodiment, the two types of user specific information is a user ID and a domain to which the user belongs as a member. These are described for purposes of example only and the user specific information can be any combination of types of user information that is used by the user when logging into the client device. This improves the ability for the user to gain subsequent access to the external service on any one of Device 1-3 because the stored association enables the cloud service to use the refresh token because the request that the cloud service received to use the external service not only includes information for authorizing the device making the request with the cloud service but also information uniquely identifying the particular user making the request without requiring the user to input additional, and likely different, credentials needed to access the external service a second time.

Figure 11:
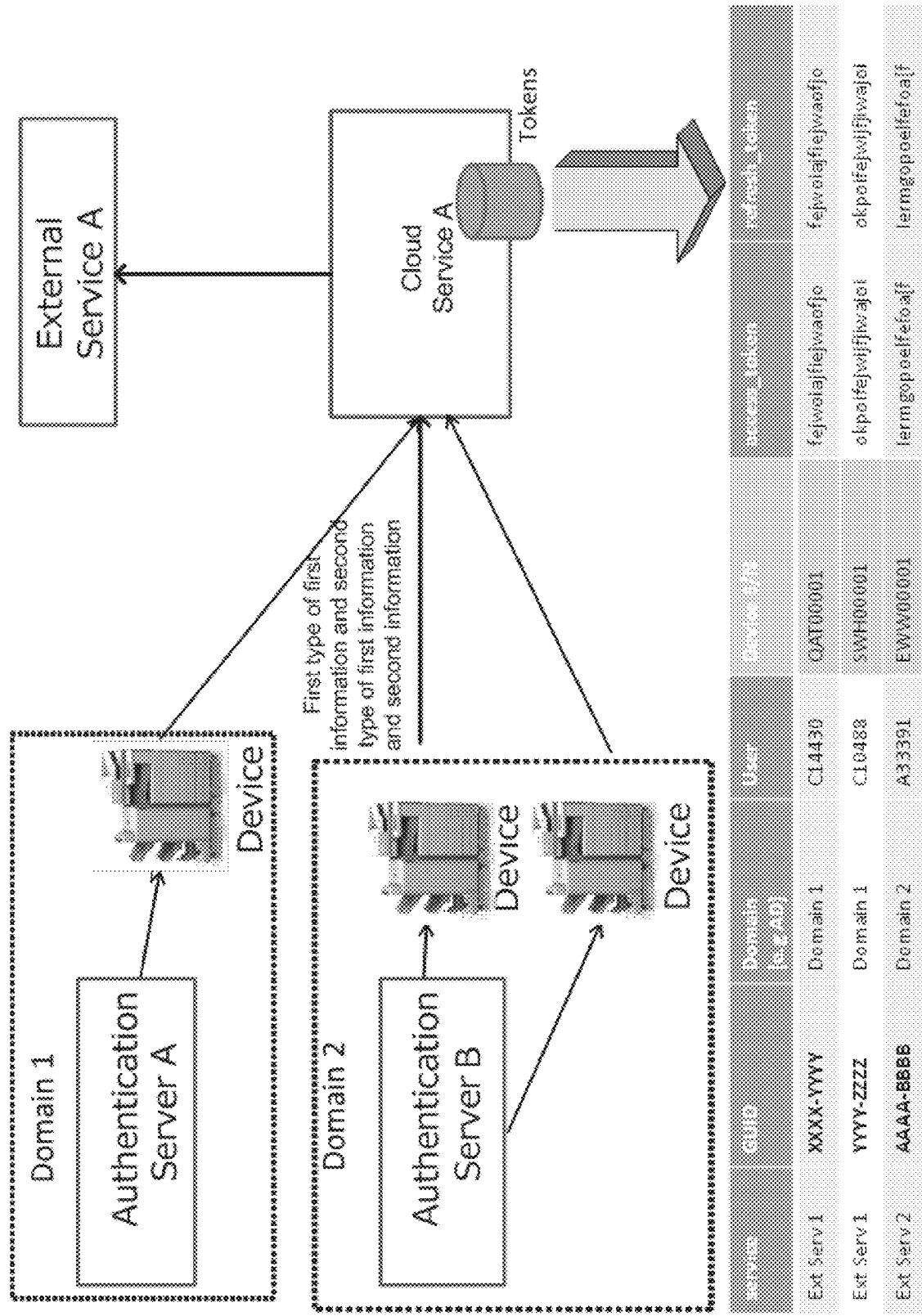
FIG. 11 illustrates an exemplary operational environment.

FIG. 11 is a schematic of another embodiment of the access management system described herein. FIG. 11 is similar to FIG. 10 but resolves another issue that presents itself in enterprise environments where users are members of multiple domains. This further improves the security associated with storing refresh tokens by the cloud service in that, in additional to a first type of first information which is information used by the user to log into the client device, a second type of information that uniquely identifies the particular device or server that was used to authenticate the user and grant the user access to the client device is also obtained and included as part of the request. In this embodiment, during the process of refresh token storage and association, the cloud service automatically associates at least one type of first information used to log into the client device (e.g. User ID and Domain) and a second type of authentication information that uniquely identifies a server used in granting the user access to the client device (e.g. a GUID generated as part of Active Directory). While a GUID is described as the unique identifier, this is merely exemplary and any unique identifier that can identify a device to authorize the user to use the client device may be possible. This may include, for example, a MAC address, IP address, or any other element that is specific to the device (or server) that authenticates a user whether it be a domain authentication or other.

FIGS. 1-11 describe a device access management system that includes a client device, an external apparatus that provides one or more services for use by the client device, and a server. The server is configured to receive, from the client device, a request to log into the server with first information identifying a user that has logged into the client device and second information the client device. The client device is authenticated with the server using the second information and access to a service provided by an external apparatus. To this end the server receives, from the client device, a request to access the service provided by the external apparatus and redirect the client device to the external apparatus enabling the client device to render a user interface for interacting with the service provided by the external apparatus. The server receives, from the client device, after successful authentication with the service of the external apparatus, the token for accessing the service. The received token for accessing the service is stored and associated, in memory, with the received token and enable subsequent access to the service.

When the server receives a request to access the external service of the external apparatus, the server determines, in response to the request to access the service on the external apparatus, whether a token associated with the first information is stored in memory. This determination is performed using the first information. In a case where it is determined that a token associated with the first information is stored in memory, the server automatically provides the token to the external apparatus and receives from the external apparatus another token usable by the server to access the external service without receiving from a user at the client device, credentials for accessing the external service. In a case where it is determined that a token associated with the first information is not stored in memory, the server causes the service of the external apparatus to be redirected to the client device for authentication therewith.

In certain embodiments the first information includes information that identifies an authentication server used to authenticate the user with the client device. In other embodiments, the first information is obtained by a browser executing on the client device from an authentication application used to authenticate the user of the client device. Further embodiments provide that the second information is unique to the client device and is used to authenticate the client device with the server.

In one embodiment, the system also includes an authentication server that authenticates one or more users of the client device and grants access to resources of the client device to authenticated users. In this embodiment, the first information includes information used by the user to log into the client device and which is used by the client device to authenticate the user at the client device with an authentication server, wherein the authentication server is different from each of the server and external apparatus, and information identifying a domain of which the user is a member.

In one embodiment, the client device includes a printer for outputting data on a recording medium, a scanner for capturing image data to be digitized and stored in a storage, and a display for displaying one or more user interfaces for receiving input from a user. The client device displays a user interface on the display that receives input from the user to generate a request that the client device be authenticated with the server and to access the service provided by the external apparatus, the request including the first information identifying a current user logged into the client device and second information specifying the client device. The client device receives a token from the external apparatus that is usable to enable the image processing device to access the service in response the server authenticating the client device with the server using the second information and the server accessing an service executing on an external apparatus; and transmits the received token to the server for storage in association with the first information to enable subsequent access to the service by the client device without providing credentials for the service at the client device.

In exemplary operation, the client device transmits, to a server, a request to log into the server, the request including first information a current user logged into the client device and second information specifying the client device. In transmitting, to the server, a request to access the service provided by the external apparatus, the client device is redirected to the external apparatus enabling the client device to render a user interface for interacting with the service provided by the external apparatus. In to response the server authenticating the client device with the server using the second information and the server accessing an service executing on an external apparatus, the client device receives a token from the external apparatus that is usable to access the service and transmitting the received token to the server for storage in association with the first information to enable subsequent access to the service by the client device without providing credentials for the service at the client device.

In certain embodiments, the client device includes a browser application executing thereon for use in accessing the server and the service provided by the external apparatus. The client device generates the request by obtaining, using the browser application, information from an authentication application used by the user to authenticate the user with the authentication server as the first information and obtaining, using the browser, information specifying the client device as the second information. The first information is combined with the second information into the request. In another embodiment, the client device obtains information identifying the authentication server used to authenticate the user of the client device and generates the request by adding the authentication server identification information to the request.

The external apparatus embodied herein may include a cloud server and the service is a storage service that enables users to have unique storage accounts for storing one or more types of data objects that are accessible via the cloud server. As such, the token provided from the server to the external apparatus is a refresh token which may be transmitted to the external apparatus causing the service to re-transmit an access token to be used to access the service by the server without receiving access credentials at the client device.

Once access is granted to the external service through the server, the server provides, to the client device, access to the service and the client device generates a user interface including one or more user selectable objects that are available for selection by a user. In one exemplary operation whereby the client device is making use of the service, in response to selection of one or more objects within the user interface, the client device is caused to output data contained in the selected one or more objects using the printer. In another exemplary operation, the client device generates a user interface for initiating scanning of one or more physical documents using the scanner and automatically uploads data representing the one or more physical documents to the service for storage in the cloud storage service.

The above description serves to explain principles of the invention; but the invention should not be limited to the examples described above. For example, the order and/or timing of some of the various operations may vary from the examples given above without departing from the scope of the invention. Further by way of example, the type of network and/or servers may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

I claim:

1. A server comprising:
a memory storing instructions; and
at least one processor that executes the instructions stored in the memory to control the at least one processor to
receive, from a client device, a request to log into the server and access a service provided by an external apparatus, the request including
first information that identifies a user, the user having already logged into and been authenticated at the client device,
second information identifying the client device, and
service information identifying the service for which access is requested;
authenticate the client device, with the server, using only the second information;
redirect the client device to the external apparatus based on the service information to enable user authentication with the service using service-specific authentication information received from the client device, wherein the redirection causes the client device to communicate directly with the external apparatus;
receive, from the client device, a token provided by the external apparatus to the client device after authentication of the user with the service provided by the external apparatus, wherein the token enables the server to access the service; and
associating, in memory, the first information that identifies the user with the token received from the client device to enable subsequent access to the service by the server when requested by the user at the client device.

2. The server according to claim 1, wherein execution of the instructions controls the at least one processor to:
receive, from the client device, a request to access the service provided by the external apparatus; and
wherein the redirection, by the server, of the client device to the external apparatus enables the client device to render a user interface for interacting with the service provided by the external apparatus.

3. The server, according to claim 1, wherein the first information includes information used by the user to log into the client device and which is used by the client device to authenticate the user at the client device with an authentication server, wherein the authentication server is different from each of the server and the external apparatus, and information identifying a domain of which the user is a member.

4. The server according to claim 1, wherein first information includes information that identifies an authentication server used to authenticate the user with the client device.

5. The server according to claim 1, wherein
the first information is obtained by a browser executing on the client device from an authentication application used to authenticate the user of the client device.

6. The server according to claim 1, wherein
the second information is unique to the client device.

7. The server according to claim 1, wherein execution of the instructions control the one or more processors to
in response to a request to access the service by the external apparatus, redirect a browser executing on the client device to the external apparatus for authentication.

8. The server according to claim 1, wherein execution of the instructions control the one or more processors to
in response to a request to access the service on the external apparatus, determine, using the first information, whether a token associated with the first information is stored in memory; and
in a case where it is determined that a token associated with the first information is stored in memory,
automatically provide the token to the external apparatus;
receive from the external apparatus another token usable by the server to access the external service without receiving credentials for accessing the external service from a user at the client device; and
in a case where it is determined that a token associated with the first information is not stored in memory,
cause the service of the external apparatus to be redirected to the client device for authentication therewith.

9. A method of controlling a server comprising:
receiving, from a client device, a request to log into the server and access a service provided by an external apparatus, the request including
first information that identifies a user, the user having already logged into and been authenticated at the client device;
second information identifying the client device; and
service information identifying the service for which access is requested;
authenticating, by the server, the client device with the server using only the second information;
redirecting, by the server, the client device to the external apparatus based on the service information to enable authentication with the service using service-specific authentication information received from the client device, wherein the redirection causes the client device to communicate directly with the external apparatus;
receiving, from the client device, a token provided by the external apparatus to the client device after authentication of the user with the service provided by the external apparatus, wherein the token enables the server to access the service; and
associating, in memory, the first information that identifies the user with the token received from the client device to enable subsequent access to the service by the server when requested by the user at the client device.

10. The method according to claim 9, further comprising
receiving, from the client device, a request to access the service provided by the external apparatus; and
wherein the redirecting, by the server, of the external apparatus to the client, enables the client device to render a user interface for interacting with the service provided by the external apparatus.

11. The method according to claim 9, wherein the first information includes information used by the user to log into the client device and which is used by the client device to authenticate the user at the client device with an authentication server, wherein the authentication server is different from each of the server and the external apparatus, and information identifying a domain of which the user is a member.

12. The method according to claim 9, wherein first information includes information that identifies an authentication server used to authenticate the user with the client device.

13. The method according to claim 9, wherein
the first information is obtained by a browser executing on the client device from an authentication application used to authenticate the user of the client device.

14. The method according to claim 9, wherein
the second information is unique to the client device.

15. The method according to claim 9, further comprising
redirecting a browser executing on the client device to the external apparatus for authentication in response to a request to access the service by the external apparatus.

16. The method according to claim 9, further comprising
in response to a request to access the service on the external apparatus, determining, using the second information, whether a token associated with the first information is stored in memory; and
in a case where it is determined that a token associated with the first information is stored in memory,
automatically providing the token to the external apparatus;
receiving from the external apparatus another token usable by the server to access the external service without receiving credentials for accessing the external service from a user at the client device; and
in a case where it is determined that a token associated with the first information is not stored in memory,
causing the service of the external apparatus to be redirected to the client device for authentication therewith.

17. A client device comprising:
a memory storing instructions; and
at least one processor that executes the instructions stored in the memory to to control the at least one processor to
transmit, to a server, a request to log into the server and access a service provided by an external apparatus, the request including
first information identifying a current user that is logged into and has been authenticated by the client device;
second information identifying the client device; and
service information identifying the service for which access is request;
in response to the server authenticating the client device with the server using only the second information based on the transmitted request and the server, based on the transmitted request, accessing the service executing on the external apparatus using the service information, receiving, by the client device, via redirection from the server, information from the external apparatus that enables the user to provide, to the external apparatus, service-specific authentication information for authentication with the service, wherein the redirection causing the client device to communicate directly with the external apparatus;

receiving, from the external apparatus, a token from the external apparatus that is usable to access the service after the user has been authenticated with the service provided by the external apparatus;

transmitting the received token to the server, wherein the transmitted token is stored in association with the first information at the server and enables subsequent access to the service by the client device without providing credentials for the service at the client device.

18. A device access management system comprising a client device;

an external apparatus that provides one or more services for use by the client device; and a server including a memory storing instructions and at least one processor that executes the instructions stored in the memory to control the at least one processor to receive, from a client device, a request to log into the server and access a service provided by an external apparatus, the request including first information that identifies a user, the user having already logged into and been authenticated at the client device, second information identifying the client device, and service information identifying the service for which access is requested;

authenticate the client device, with the server, using only the second information;

redirect the client device to the external apparatus based on the service information to enable authentication with the service using service-specific authentication information received from the client device, wherein the redirection causes the client device to communicate directly with the external apparatus;

receive, from the client device, a token provided by the external apparatus to the client device after authentication of the user with the service provided by the external apparatus, wherein the token enables the server to access the service; and associating, in memory, the first information that identifies the user with the token received from the client device to enable subsequent access to the service by the server when requested by the user at the client device.

\* \* \* \* \*